US008872399B2

(12) United States Patent
Chamberlin et al.

(10) Patent No.: US 8,872,399 B2
(45) Date of Patent: Oct. 28, 2014

(54) STATOR WINDING ASSEMBLY AND METHOD

(75) Inventors: Brad Chamberlin, Pendleton, IN (US); Larry Kubes, Indianapolis, IN (US); Alex Creviston, Muncie, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 226 days.

(21) Appl. No.: 13/112,204

(22) Filed: May 20, 2011

(65) Prior Publication Data

US 2011/0285221 A1 Nov. 24, 2011

Related U.S. Application Data

(60) Provisional application No. 61/346,964, filed on May 21, 2010.

(51) Int. Cl.
| | |
|---|---|
| *H02K 9/00* | (2006.01) |
| *H02K 9/08* | (2006.01) |
| *H02K 1/20* | (2006.01) |
| *H02K 9/19* | (2006.01) |

(52) U.S. Cl.
CPC ... *H02K 1/20* (2013.01); *H02K 9/19* (2013.01)
USPC .................. 310/54; 310/52; 310/57; 310/58

(58) Field of Classification Search
CPC ................................ H02K 9/00; H02K 9/08
USPC ......................................... 310/52, 54, 57, 58
See application file for complete search history.

(56) References Cited

U.S. PATENT DOCUMENTS

| | | | | |
|---|---|---|---|---|
| 1,448,700 A | * | 3/1923 | Seidner | 310/54 |
| 1,779,797 A | * | 10/1930 | Baum | 310/54 |
| 3,435,263 A | * | 3/1969 | Willyoung | 310/61 |
| 3,445,695 A | * | 5/1969 | Schultz | 310/58 |
| 3,447,002 A | * | 5/1969 | Ronnevig | 310/54 |
| 3,597,645 A | | 8/1971 | Duffert et al. | |
| 3,675,056 A | * | 7/1972 | Lenz | 310/54 |
| 4,691,131 A | | 9/1987 | Nakano | |
| 4,745,314 A | | 5/1988 | Nakano | |
| 2006/0028075 A1 | * | 2/2006 | Noda et al. | 310/64 |
| 2009/0026858 A1 | | 1/2009 | Knauff | |

FOREIGN PATENT DOCUMENTS

| | | | |
|---|---|---|---|
| DE | 102007013051 A1 | * | 9/2008 |
| JP | 07087711 A | | 3/1995 |
| JP | 2002058182 A | * | 2/2002 |
| JP | 2002142393 A | | 5/2002 |
| JP | 2006081379 A | | 3/2006 |

OTHER PUBLICATIONS

Machine Translation DE102007013051 (2008).*
Machine Translation JP2002058182 (2002).*
International Written Opinion and Search Report dated Jan. 12, 2012 No. PCT/US2011/037103.

* cited by examiner

*Primary Examiner* — Tran Nguyen
*Assistant Examiner* — Jose Gonzalez Quinones
(74) *Attorney, Agent, or Firm* — Cantor Colburn LLP

(57) ABSTRACT

An electrical device includes a plurality of stacked laminates that form a tubular stator portion, a cooling passage partially defined by orifices formed in the plurality of stacked laminates, a housing including a cavity further defining the cooling passage, the cooling passage defining a fluid flow path parallel to a rotational axis of the stator portion, a sump portion communicative with the cooling passage, the sump portion including a cavity defined by the stator portion and the housing member.

21 Claims, 5 Drawing Sheets

STATOR WINDING ASSEMBLY AND METHOD

CROSS-REFERENCE TO RELATED APPLICATIONS

This application claims the benefit of U.S. Provisional Application No. 61/346,964, filed May 21, 2010.

BACKGROUND OF THE INVENTION

Electric machines such as alternators typically utilize stators that have a plurality of slots therein within which conductive windings are positioned. Current flowing through the windings during operation of the machine generates magnetic fields that facilitate the machine's conversion of mechanical energy into electrical energy or vice versa. The operation of an electric machine often increases the temperature of the stator. Temperature is a cause of operational concern for electrical machines as it reduces performance during operation and over a longer term reduces machine life. In view hereof, assemblies and methods that tend to reduce operating temperatures of electric machines are well received by the art.

BRIEF DESCRIPTION OF THE INVENTION

In an exemplary embodiment an electrical device includes a plurality of stacked laminates that form a tubular stator portion, a cooling passage partially defined by orifices formed in the plurality of stacked laminates, a housing including a cavity further defining the cooling passage, the cooling passage defining a fluid flow path parallel to an axis of the stator portion, a sump portion communicative with the cooling passage, the sump portion including a cavity defined by the stator portion and the housing member.

In another exemplary embodiment an electrical device includes a plurality of stacked laminates that form a tubular stator portion, a cooling passage partially defined by orifices formed in the plurality of stacked laminates, a housing including a cavity further defining the cooling passage, the cooling passage defining a fluid flow path that is aligned radially relative to an axis of the stator portion, a sump portion communicative with the cooling passage, the sump portion including a cavity defined by the stator portion and the housing member.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of an embodiment of the disclosed apparatus and method are presented herein by way of exemplification and not limitation with reference to the Figures.

Figure 1:
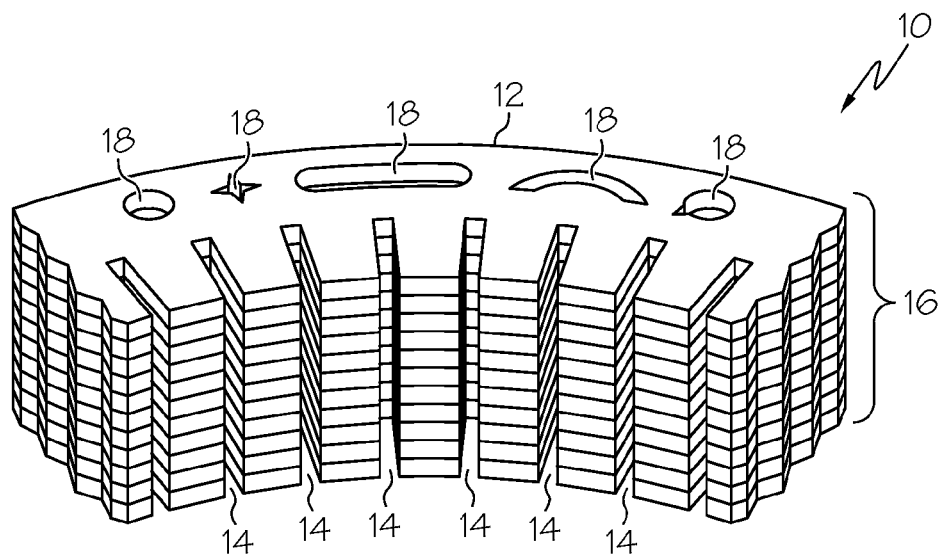
FIG. 1 depicts a partial perspective view of a stator assembly disclosed herein.

FIG. 1 illustrates a portion of an exemplary embodiment of a stator assembly 10. The assembly 10 includes a stator 12 having a tubular body with a plurality of slots 14. The stator 12 is constructed from a plurality of stacked and attached laminations 16. The illustrated assembly includes a plurality of cooling passages 18. The illustrated cooling passages 18 are shown with examples of a variety of shapes and profiles including, for example, circular shaped, star shaped, oval shaped, and crescent shaped. In operation, a cooling fluid flows through the cooling passages 18 and cools that stator 12.

In fabrication, the laminations 16 are cut or stamped into the stator shape from a metallic sheet material. The stamping and cutting of the laminations into the stator shape includes the stamping or cutting of the cooling passages 18 in the laminations by forming orifices in the laminations 16. Thus, the stator shape and the cooling passages 18 may be stamped or cut in a single step, or in multiple steps. Once the stator laminations 16 are fabricated, the laminations 16 are stacked in a desired order, the orifices are aligned to form cooling passages 18, and the laminations 16 are attached together to form the stator 12 having the cooling passages 18. One exemplary method for attaching the laminations 16 is to apply an adhesive to the metallic sheet material prior to the fabrication of the laminations 16. Once cut and stacked, heat and pressure may be applied to the laminations 16 to activate the adhesive and bond the laminations 16 together.

Figure 2:
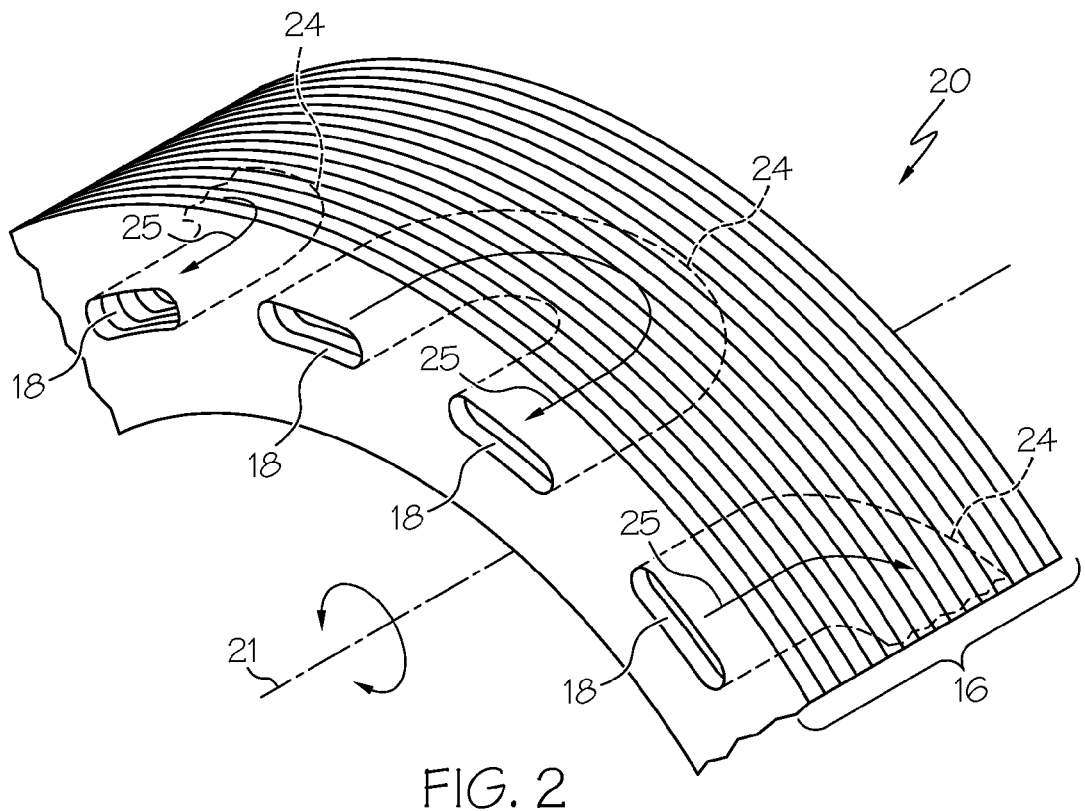
FIG. 2 depicts a partial perspective view of an alternate embodiment of a stator assembly disclosed herein.

FIG. 2 illustrates an alternate exemplary embodiment of a stator assembly 20. The stator assembly 20 includes a stator 22 having cooling passages 18. In the stator assembly 20, the cooling passages 18 include portions that are orientated parallel to axis 21. The cooling passages 18 include curved portions 24 that connect the parallel portions. Cooling fluid may flow parallel and substantially perpendicular to the axis 21 along a fluid flow path indicated by the arrows 25 and defined by the cooling passages 18. The curved portions 24 of the cooling passages 18 and the cooling passages 18 of FIG. 2 may be formed in a similar manner as the cooling passages 18 of FIG. 1 above by, for example, stamping or cutting the laminations 16 to form the curved portions 24.

Figure 3:
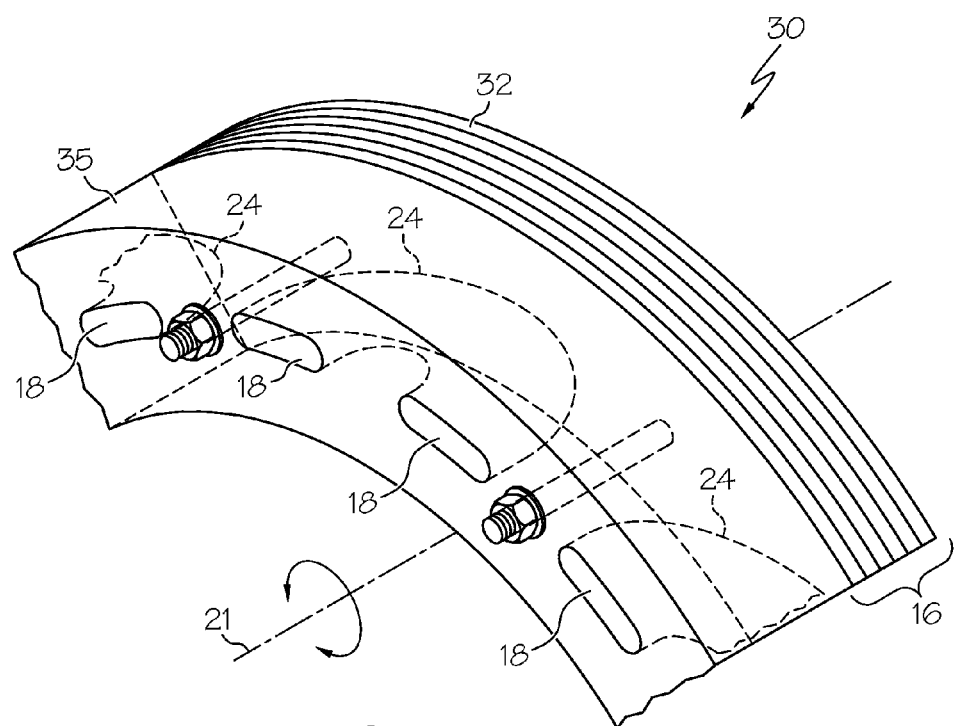
FIG. 3 depicts a partial perspective view of another alternate embodiment of a stator assembly disclosed herein.

FIG. 3 illustrates an alternate exemplary embodiment of a stator assembly 30. The stator assembly 30 is similar to the stator assembly 20 (of FIG. 2) described above, however the curved portions 34 of the cooling passages 18 are formed in a housing portion 35 that is fastened to the stator 32.

Figure 4:
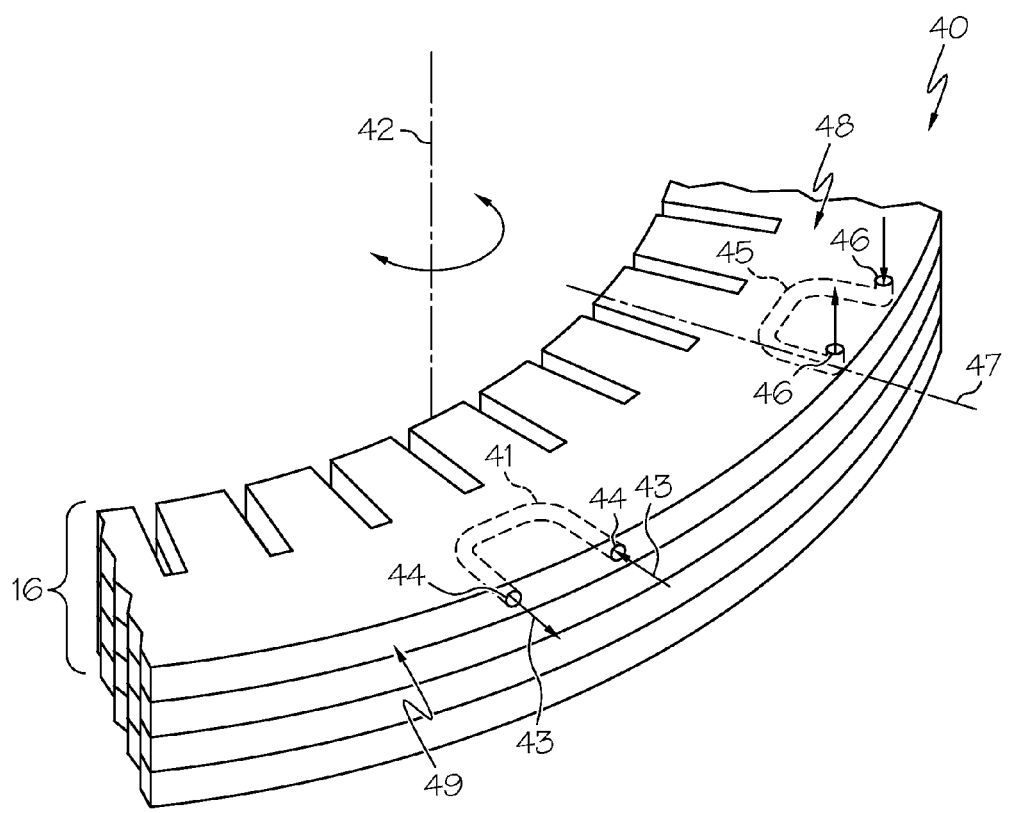
FIG. 4 depicts a partial perspective view of yet another alternate embodiment of a stator assembly disclosed herein.

FIG. 4 illustrates another alternate exemplary embodiment of a stator assembly 40. The stator assembly 40 includes laminations 16 and is fabricated in a similar manner as described above. The stator assembly 40 includes cooling passages 41 that are orientated substantially radially relative to axis 42. A radial line relative to the axis 42 is illustrated by the line 47. The flow of fluid is illustrated by the arrows 43. The illustrated embodiment includes ports 44 that are disposed on the arcuate outer radial surface 49 of the stator assembly 40. The cooling passages 45 are similar to the cooling passages 41 and include ports 46 that are disposed on the planar surface 48 of the stator assembly 40. The stator assembly 40 may include any combination of ports 46 and 44 that may be located on the outer radial surface 49 or the planar surface 48 of the stator assembly 40. In alternate embodiments, ports 46 may be located on the planar surface (not shown) opposing the planar surface 48.

Figure 5:
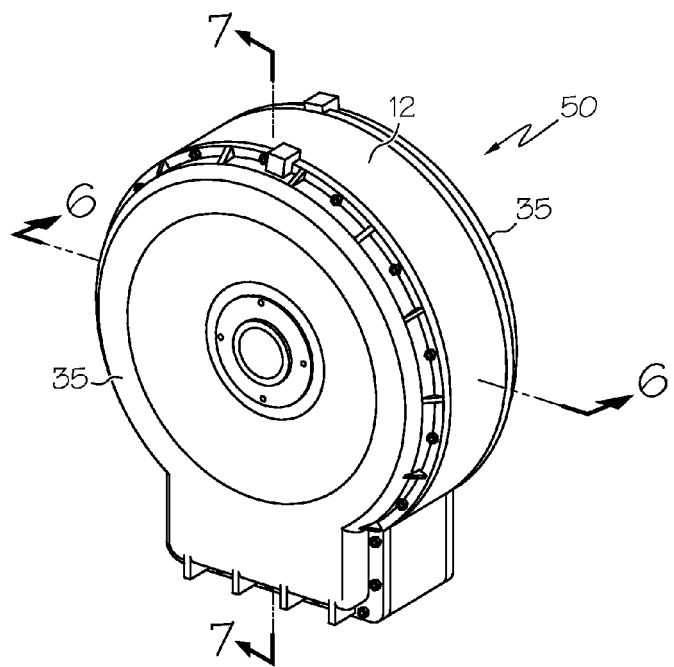
FIG. 5 depicts a perspective view of an exemplary embodiment of an electrical device assembly disclosed herein.

FIG. 5 illustrates a perspective view of an exemplary embodiment of an electrical device assembly (device) 50 that includes a stator 12. The electrical device assembly 50 may be operated as, for example, a motor, alternator, or generator device. The stator 12 is shown for illustrative purposes, however any of the stator assemblies described above may be similarly disposed in the device 50. The motor assembly 50 includes housing portions 35 that may be fastened to the stator 12.

Figure 6:
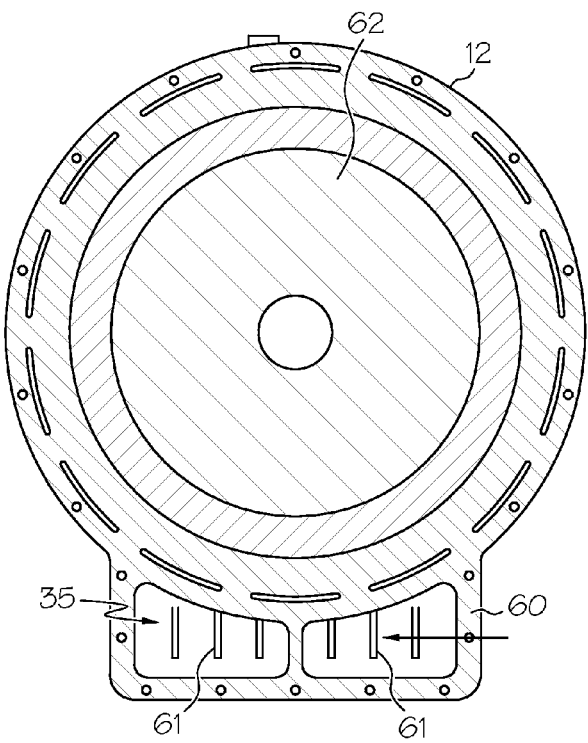
FIG. 6 illustrates a front view of the electrical device assembly of FIG. 5.

FIG. 6 illustrates a front view of the motor assembly 50 with a housing portion 35 removed. The device 50 includes a sump portion 60 that includes cavities 61 defined by portions of the stator 12 and the housing portions 35. In the illustrated embodiment the sump portion 60 is arranged as an extension from the stator portion 40. The sump portion 60 is formed in the laminations 16 using a similar process as described above to form the cooling passages 45 (of FIG. 4). The sum may be used to retain and cool cooling lubricant that flows through the cooling passages 45 of the stator assembly 40. The sump portion 60 is sized and arranged to hold a sufficient amount of cooling lubricant to cool the stator assembly 40. The amount of cooling lubricant may, for example, depend on the amount of heat that is desired to be removed from the stator assembly 40. A rotor assembly 62 is disposed in the device 50. The rotor assembly 62 is aligned coaxially with the stator 12 and is operative to rotate relative to the stator 12.

Figure 7:
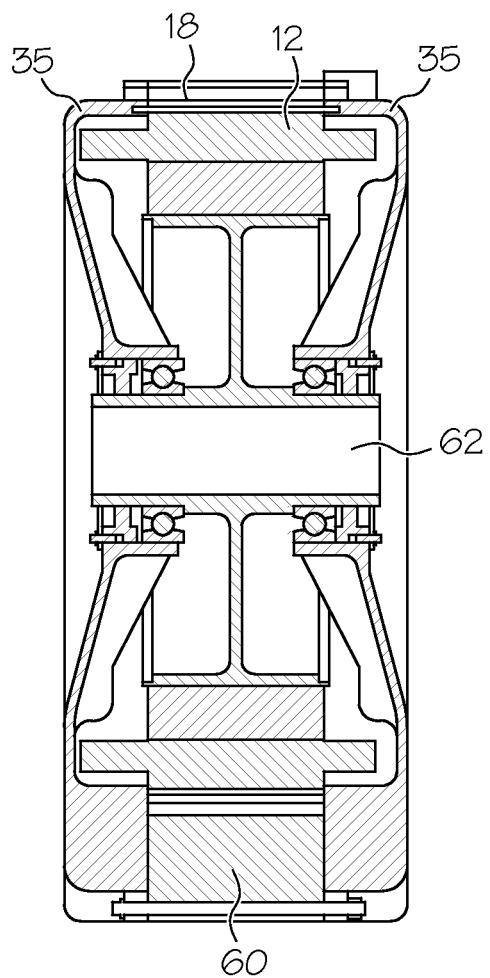
FIG. 7 illustrates a side partially cut-away view of the electrical device assembly of FIG. 5.

FIG. 7 illustrates a side cross-sectional view of the device 50 that includes the cooling passages 18.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electrical device including:
   a plurality of stacked laminates that form a tubular stator portion;
   a cooling passage partially defined by orifices formed in the plurality of stacked laminates;
   a housing including a cavity further defining the cooling passage, the cooling passage defining a fluid flow path parallel to an axis of the stator portion; and
   a sump portion communicative with the cooling passage, the sump portion including a cavity defined radially and circumferentially by the stator portion and axially by the housing.

2. The device of claim 1, wherein the cavity of the housing defines an arcuate fluid flow path.

3. The device of claim 1, wherein at least one of the orifices formed in the plurality of stacked laminates is formed on a planar surface of at least one of the stacked laminates.

4. The device of claim 1, wherein the housing includes a first housing member and a second housing member each attached to the stator portion.

5. The device of claim 1, wherein the sump portion is operative to retain a cooling fluid.

6. The device of claim 1, wherein the stator portion includes a plurality of slots extending radially from an axis of the stator portion.

7. The device of claim 1, wherein the device includes a rotor portion aligned coaxially with the stator portion.

8. The device of claim 1, wherein the plurality of stacked laminates are secured together with an adhesive.

9. The device of claim 1, wherein the device is an electric machine.

10. An electrical device including:
    a plurality of stacked laminates that form a tubular stator portion;
    a cooling passage partially defined by orifices formed in the plurality of stacked laminates;
    a housing including a cavity further defining the cooling passage, the cooling passage defining a fluid flow path that is aligned radially relative to an axis of the stator portion; and
    a sump portion communicative with the cooling passage, the sump portion including a cavity defined radially on an inner and outer side thereof and circumferentially by the stator portion and axially by the housing.

11. The device of claim 10, wherein the cavity of the housing defines an arcuate fluid flow path.

12. The device of claim 10, wherein at least one of the orifices formed in the plurality of stacked laminates is formed on a planar surface of at least one of the stacked laminates.

13. The device of claim 10, wherein the housing includes a first housing member and a second housing member each attached to the stator portion.

14. The device of claim 10, wherein the sump portion is operative to retain a cooling fluid.

15. The device of claim 10, wherein the stator portion includes a plurality of slots extending radially from an axis of the stator portion.

16. The device of claim 10, wherein the device includes a rotor portion aligned coaxially with the stator portion.

17. The device of claim 10, wherein the plurality of stacked laminates are secured together with an adhesive.

18. The device of claim 10, wherein the device is an electric machine.

19. The device of claim 1, wherein a portion of the cooling passage defining the fluid flow path parallel to an axis of the stator portion is defined by the orifices,
    another portion of the cooling passage defined by the orifices defines the fluid flow path as perpendicular to the rotational axis of the stator portion, and
    the portion and the another portion are connected at an elbow portion.

20. An electrical device including:
    a plurality of stacked laminates that form a tubular stator portion, the plurality of stacked laminates being formed to define orifices that define a first portion of a cooling passage;
    a housing including a cavity further defining a second portion of the cooling passage,
    the first portion of the cooling passage defining first and second transverse fluid flow path components that are connected at an elbow portion, one of the first and second transverse fluid flow path components having a predominant fluid flow direction disposed in parallel to an axis of the stator portion; and
    a sump portion communicative with the cooling passage, the sump portion including a cavity defined radially and circumferentially by the stator portion and axially by the housing.

21. The electrical device according to claim 20, wherein the tubular stator portion encompasses the first and second transverse fluid flow path components.

* * * * *